United States Patent
Dragwidge et al.

[11] Patent Number: 5,946,391
[45] Date of Patent: Aug. 31, 1999

[54] TELEPHONES WITH TALKER SIDETONE

[75] Inventors: Trevor Dragwidge, Hampshire, United Kingdom; Richard George, Copenhagen, Denmark; Adrian Kennard, Berkshire; Richard Williams, Surrey, both of United Kingdom

[73] Assignee: Nokia Mobile Phones Limited, Salo, Finland

[21] Appl. No.: 08/754,145

[22] Filed: Nov. 22, 1996

[30] Foreign Application Priority Data

Nov. 24, 1995 [GB] United Kingdom ............... 9524093

[51] Int. Cl.[6] .................................................. H04M 1/00
[52] U.S. Cl. ............................ 379/391; 379/390; 379/388
[58] Field of Search ............................. 379/391, 390, 379/392, 388; 381/57, 104

[56] References Cited

U.S. PATENT DOCUMENTS

| | | | |
|---|---|---|---|
| 4,081,620 | 3/1978 | Goodman et al. | 179/81 A |
| 4,445,002 | 4/1984 | Terry | 179/81 A |
| 4,715,062 | 12/1987 | Korsky et al. | 379/390 |
| 5,640,450 | 6/1997 | Watanabe | 379/392 |
| 5,692,042 | 11/1997 | Sacca | 379/387 |

FOREIGN PATENT DOCUMENTS

| | | |
|---|---|---|
| 01 042964 | 2/1989 | European Pat. Off. . |
| 04 216216 | 8/1992 | European Pat. Off. . |
| 04 332237 | 11/1992 | European Pat. Off. . |
| 07 058683 | 3/1995 | European Pat. Off. . |
| 09 181817 | 7/1997 | European Pat. Off. . |
| 2 291 318 | 1/1996 | United Kingdom . |

*Primary Examiner*—N. Le
*Assistant Examiner*—Shih-Wen Hsieh
*Attorney, Agent, or Firm*—Perman & Green, LLP

[57] ABSTRACT

A telephone, particularly a portable handset operable in a digital radio telephone system, has a sidetone gain circuit 28 which applies one of two levels of gain G1 G2 dependent on whether a detector 30 detects a high magnitude of input signal 14 corresponding to speech or a low level of input signal 14 corresponding to an idle condition. With varying magnitude of input signal 14, the gain switches between G1 and G2 dependent on two thresholds T1 and T2 of the input signal, the relationship including hysteresis to prevent unduly rapid switching.

8 Claims, 2 Drawing Sheets

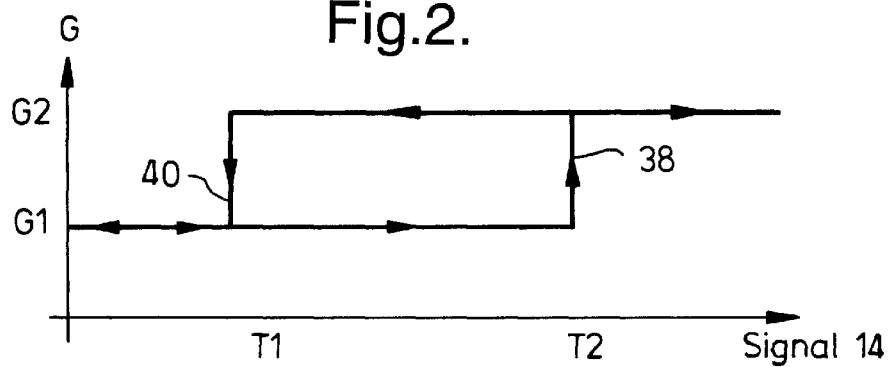
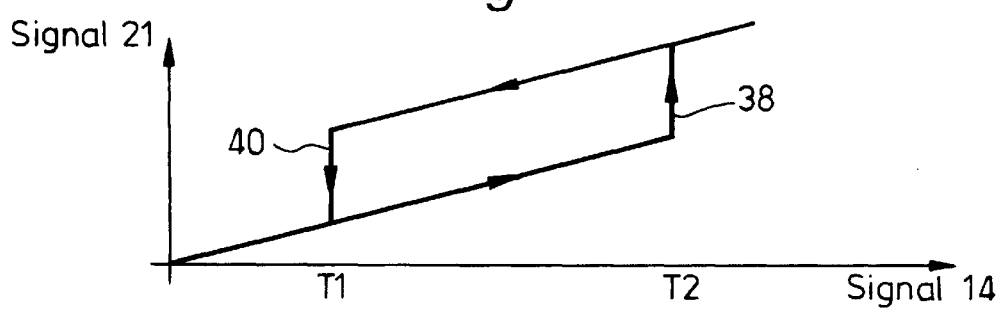
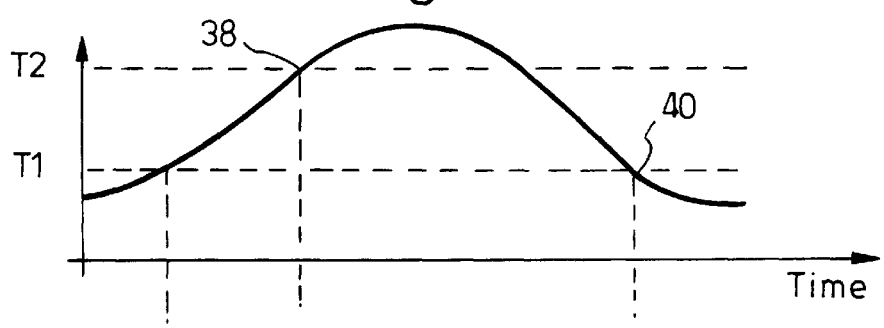
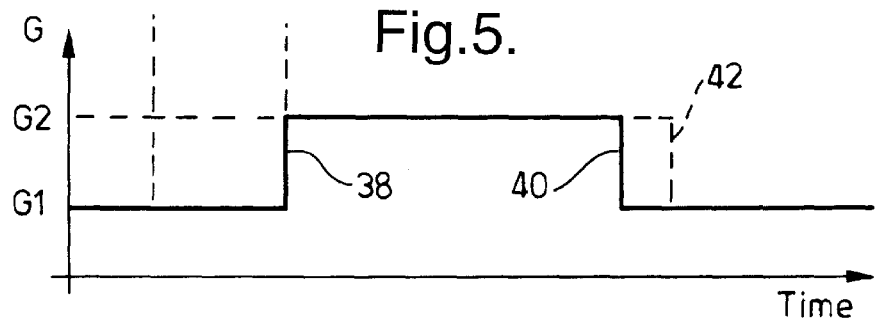

TELEPHONES WITH TALKER SIDETONE

BACKGROUND OF THE INVENTION

This invention relates to telephones with talker sidetone, an effect which occurs when a speaker hears a small amount of his own voice in the earpiece as a result of a proportion of the speech signal received by the microphone being fed back to the output signal supplied to the earpiece. This is a desirable feature in a telephone because it is interactive and gives the user a feeling that the telephone is "alive" and therefore functioning properly. A telephone without talker sidetone is disconcerting to use because it seems entirely passive to received speech and therefore "dead" to the user.

In conventional telephones the amplitude of the signal fed back as talker sidetone, the sidetone gain, is immutable. The gain level is preset to provide an appropriate level of talker sidetone for speech. A disadvantage of this is that any background noise that is present will also be picked up by the microphone and it too will be fed back to the earpiece. This is an undesirable effect which the present invention is intended to overcome.

SUMMARY OF THE INVENTION

According to one aspect of the invention a telephone has a first transducer for converting input sound to an electrical input, a second transducer for converting an electrical output to an output sound, means for feeding back a part of the input to the output as a talker sidetone signal and means for varying the magnitude of the talker sidetone signal in dependence upon the magnitude of the input.

The invention is applicable to any telephone having the means for generating talker sidetone, including a telephone hard wired to the exchange or a radio telephone such as a digital or analogue portable handset for use in a cordless or cellular radio telephone system.

However it is thought that the invention will have particular application in a digital portable handset operable in a digital radio telephone system. Hence, according to another aspect of the invention there is provided a portable telephone handset for use in a digital radio telephone system, the handset having a microphone for converting input sound to an electrical input signal, a loudspeaker for converting an electrical output signal to an output sound, a digital signal processor including a sidetone feedback path for feeding back part of the input signal to the output signal as a talker sidetone signal, the feedback path including gain control means for varying the gain applied to the sidetone signal, detecting means for detecting the magnitude of the input signal, storage means having programmed therein two threshold levels for the input signal and two levels of gain for the gain control means, the gain control means applying a higher level of gain in dependence upon when the detected magnitude of the input signal exceeds the upper threshold level and applying a lower level of gain in dependence upon when the detected magnitude of the input signal is less than the lower threshold level.

BRIEF DESCRIPTION OF THE DRAWINGS

A digital radio telephone according to the invention will now be described, by way of example, with reference to the accompanying drawings in which:

FIGS. 2 to 5 are graphs for explaining the operation of the telephone.

DETAILED DESCRIPTION OF THE INVENTION

Figure 1:
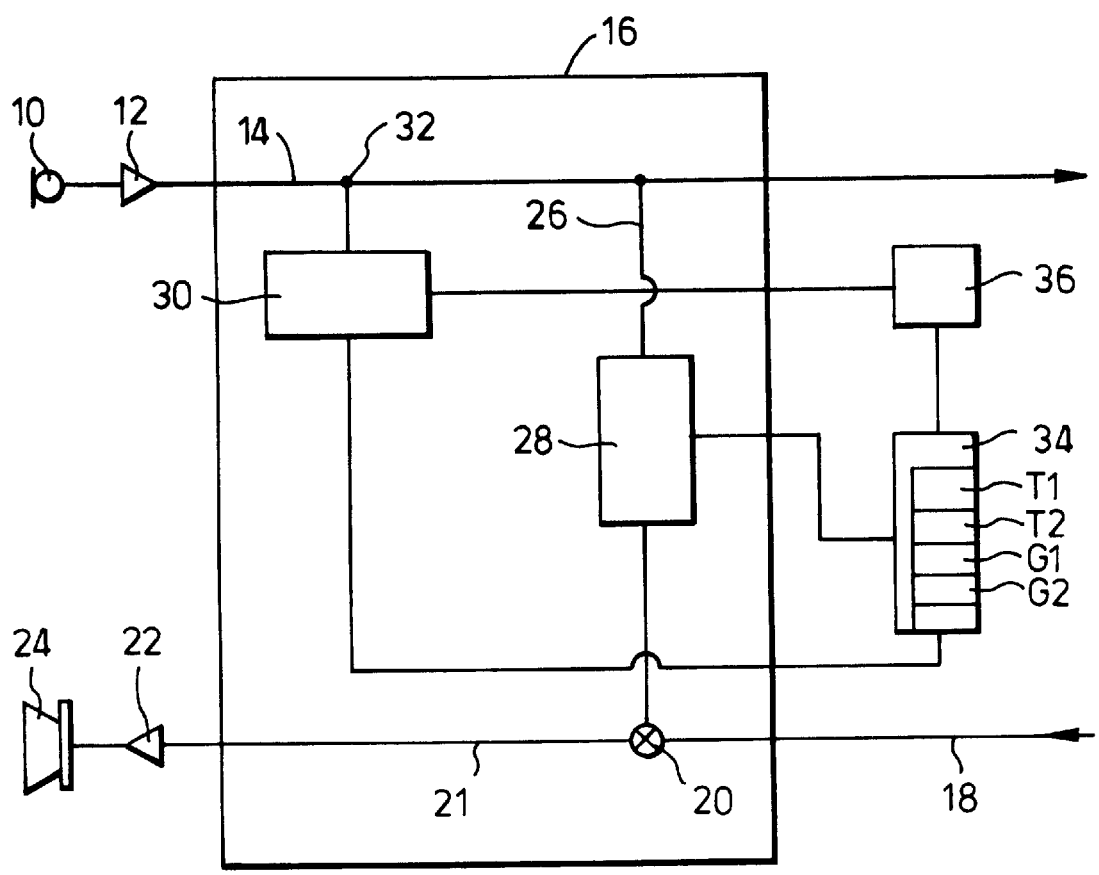
FIG. 1 is a block circuit diagram of part of the telephone.

Referring to FIG. 1, the telephone is a handset operative in a cellular or cordless digital radio telephone system having a plurality of base stations with which the handset can communicate. The handset has a mouthpiece incorporating a first transducer in the form of a microphone 10 which converts sound into an electrical input signal which is amplified at 12 and then fed as an input signal 14 to a digital signal processor 16 of the handset. Beyond the digital signal processor, 16 the input signal proceeds to the radio frequency stage (not shown) of the handset. The output signal 18 arrives from the radio frequency stage, passes through a summer 20 in the digital signal processor 16, is amplified at 22 and is then fed to a second transducer in the form of a loudspeaker 24 incorporated in the earpiece of the handset.

A proportion of the input signal 14 is fed back to be combined with the output signal 18 in the summer 20 by means of a feedback loop 26 incorporating a sidetone gain control circuit 28. Hence, the signal 21 leaving the summer 20 is the sum of the output signal 18 and the feedback signal derived from the gain control circuit 28. Also, the digital signal processor 16 includes a detector 30 which detects the magnitude of the input signal 14 at point 32.

The handset includes storage means in the form of an EEPROM 34 having at least four data fields which are pre-programmed with data at the factory. The operative functioning of the handset, and in particular the variations in the gain applied by the circuit 28, is controlled by a micro-controller 36 under software control. The data fields in the EEPROM 34 are factory programmed with four parameters, namely:

A lower threshold level T1 for the input signal 14

An upper threshold level T2 for the input signal 14

A lower level of gain G1 for the gain control circuit 28, and

An upper level of gain G2 for the gain control circuit 28.

T1 is set to be below normal speech levels but high enough so that general ambient noise levels are below T1.

FIGS. 2 to 5 show how the gain control circuit 28 alters the magnitude of the talker sidetone signal. FIG. 2 is a plot of the gain G applied by the gain control circuit 28 against a voltage representative of the magnitude of the input signal 14 at point 32. FIG. 3 is a plot of the magnitude of the output signal 21 against the magnitude of the input signal 14. FIG. 4 is a plot of the magnitude of the input signal 14 against time for an exemplary variation of input signal, and FIG. 5 is a plot of the corresponding gain (G) of the gain control circuit 28 plotted against time.

The operation of the handset is as follows. The magnitude of the input signal 14 is monitored at point 32 by the detector 30. Considering the input signal 14 to be increasing with time from a low level and with the gain control circuit 28 to be applying the lower gain G1, the gain applied to the sidetone signal will be at a comparatively low level. When the magnitude of the input signal exceeds T1 the lower level of gain G1 is maintained until the magnitude of the input signal reaches the threshold T2, at which point the gain of the gain control circuit is raised to the upper value G2. When the magnitude of the input signal decreases from a high level, gain G2 is maintained until the magnitude of the input signal falls below the lower threshold T1.

The gain of the gain control circuit 28 thus switches between G1 and G2 dependent on whether the input signal 14 is speech (level T2 or above) or noise (level T1 or below). The two switching points are indicated at 38 and 40 in FIGS.

2 to 5. The switching between G1 and G2 accordingly occurs with hysteresis as seen by the hysteresis loops of FIGS. 2 and 3. This prevents unwanted rapid switching between levels G1, G2 and therefore tends to maintain stability. A further factor tending to maintain stability is to maintain the gain at the higher level G2 for a pre-determined time interval eg 8 milliseconds after a decreasing input signal has fallen through the threshold level T1, as indicated at 42 in FIG. 5. The higher level G2 is maintained for the time interval providing that the input signal does not rise about level T1 in the interval.

To make the handset more adaptive to differing levels of background noise the EEPROM may be pre-programmed with more than two levels of threshold and with more than two levels of gain.

As presently proposed, the detector 30 detects the magnitude of the input signal 14 but a refinement would be to incorporate a voice activity detector which would discriminate between an input signal representing noise and an input signal resulting from speech. This would improve performance but would add to the complication and expense of the handset.

The described arrangement has the following advantages:

by adjusting the gain in the sidetone path 26, the transmitted speech is not directly affected, so undesirable effects such as clipped speech are not present by using existing hardware in the telephone, additional hardware costs are zero the thresholds T1 and T2 and the gains G1 and G2 are in software and their values can be selected by the manufacturer to meet particular requirements or technical specifications the use of a higher level of sidetone gain for speech and a lower level of sidetone gain for "idle" allows the listener sidetone specification (a technical rating) to be met.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What is claimed is:

1. A telephone having a first transducer for converting input sound to an electrical input signal, a second transducer for converting an electrical output signal to an output sound, means for feeding back a part of the electrical input signal to the electrical output signal as a talker sidetone signal, and means for varying the magnitude of the talker sidetone signal in dependence upon the magnitude of the electrical input signal, wherein the telephone has a detector for detecting the magnitude of the electrical input signal and the telephone has programmed therein two levels of threshold of magnitude of the electrical input signal, the sidetone gain being at a lower level or at a higher level in dependence upon the magnitude of the electrical input signal in a hysteresis relationship to the two thresholds.

2. A telephone according to claim 1, wherein the means for varying the magnitude of the talker sidetone signal comprise a sidetone gain control circuit coupled between the first transducer and the second transducer.

3. A telephone according to claim 2, wherein the sidetone gain control circuit is operative to apply a lower level of gain for a low magnitude of the electrical input signal and a higher level of gain for higher magnitudes of the electrical input signal.

4. A telephone according to claim 1, wherein the sidetone gain changing from the lower level to the higher level when an increasing magnitude of the electrical input signal broaches the upper threshold and the sidetone gain changing from the higher level to the lower level when a decreasing magnitude of the electrical input signal passes through the lower threshold.

5. A telephone according to claim 1, wherein the sidetone gain changing from the lower level to the higher level when an increasing magnitude of the electrical input signal broaches the upper threshold and the sidetone gain changing from the higher level to the lower level when a predetermined time interval has elapsed after a decreasing magnitude of the electrical input signal passes through the lower threshold, providing that the magnitude of the electrical input signal has not exceeded the lower threshold in the predetermined time interval.

6. A handset for use in a radio telephone system, the handset having a microphone for converting input sound to an electrical input signal, a loudspeaker for converting an electrical output signal to an output sound, a signal processor including a sidetone feedback path for feeding back part of the electrical input signal to the electrical output signal as a talker sidetone signal, the feedback path including gain control means for varying a gain applied to the sidetone signal, detecting means for detecting the magnitude of the electrical input signal, storage means having programmed therein at least two threshold levels for the electrical input signal and at least two levels of gain for the gain control means, the gain control means applying a higher level of gain in dependence upon when the detected magnitude of the electrical input signal exceeds an upper threshold level and applying a lower level of gain in dependence upon when the detected magnitude of the electrical input signal is less than a lower threshold level, the gain control means thereby operating in a hysteresis relationship to the two threshold levels.

7. A method for operating a radio telephone, comprising steps of:

operating a microphone to transform an audio input signal to an electrical input signal;

operating a loudspeaker to transform an electrical output signal into an audio output signal; and combining a portion of the electrical input signal with the electrical output signal such that the audio output signal includes an audio sidetone signal;

wherein the step of combining includes a step varying a magnitude of the portion of the electrical input signal in accordance with a magnitude of the electrical input signal, and in accordance with a plurality of electrical input signal threshold levels that are stored in a memory of the radio telephone, such that the variation in the magnitude of the portion of the electrical input signal exhibits hysteresis with regard to the plurality of electrical signal threshold levels.

8. A handset for use in a radio telephone system, the handset having a microphone for converting input sound to an electrical input signal, a loudspeaker for converting an electrical output signal to an output sound, a signal processor including a sidetone feedback path for feeding back part of the electrical input signal to the electrical output signal as a talker sidetone signal, the feedback path including gain control means for varying a gain applied to the sidetone signal, voice activity detecting means for detecting a presence or absence of a user's voice signal in the input sound, and storage means having programmed therein at least two levels of gain for the gain control means, the gain control means applying a higher level or a lower level of gain in dependence upon whether the user's voice signal is detected in the input sound, the level of gain being at a lower level or at a higher level in dependence upon the detection of the user's voice signal in a hysteresis relationship to the two thresholds.

* * * * *